United States Patent [19]

Frank

[11] 4,047,031
[45] Sept. 6, 1977

[54] APPARATUS FOR OBTAINING RADIOGRAPHS

[75] Inventor: Lee Fitzpatrick Frank, Rochester, N.Y.

[73] Assignee: Eastman Kodak Company, Rochester, N.Y.

[21] Appl. No.: 679,550

[22] Filed: Apr. 22, 1976

[51] Int. Cl.² .............................................. G01T 5/04
[52] U.S. Cl. ................................................. 250/335
[58] Field of Search ....................................... 250/335

[56] References Cited

U.S. PATENT DOCUMENTS

| 2,418,523 | 4/1947 | Neddermeyer et al. | 250/335 X |
| 2,899,557 | 8/1959 | Wilson | 250/335 X |
| 3,233,104 | 2/1966 | Heffan | 250/335 |

OTHER PUBLICATIONS

180-Liter Xenon Bubble Chamber, by Kuznetsov et al., from Institute of Theoretical & Exper. Physics, No. 2, Mar.-Apr. 1970.

Primary Examiner—Archie R. Borchelt
Attorney, Agent, or Firm—Milton S. Sales

[57] ABSTRACT

Apparatus for making X-ray pictures by imagewise exposing a cloud chamber containing a high atomic number gas mixed with a condensate vapor. The gas is under sufficiently high pressure to assure substantially complete absorption of the incident X-rays. Optical means are provided so that visible X-ray tracks are viewed from a direction aligned with the tracks.

10 Claims, 1 Drawing Figure

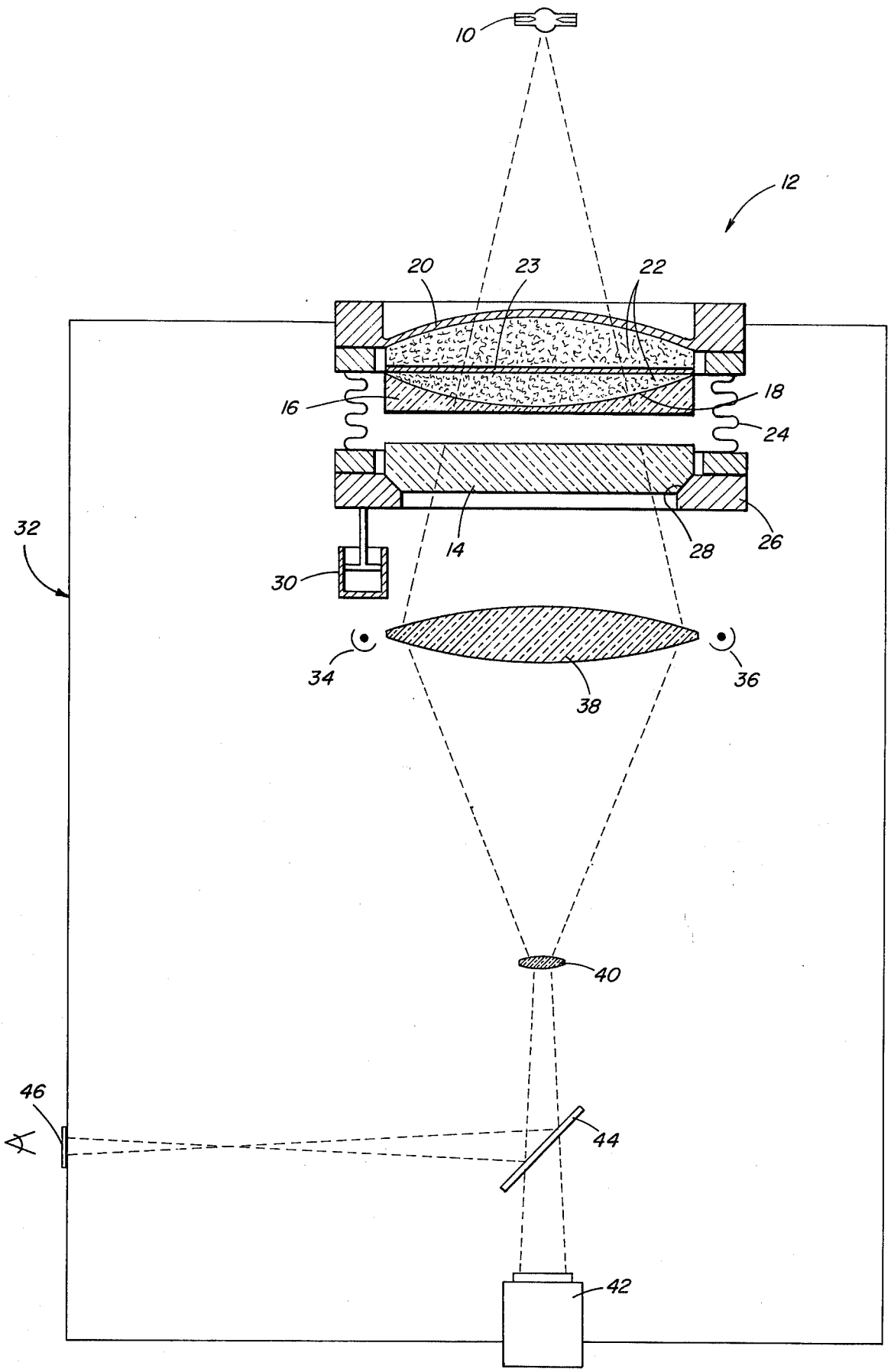

APPARATUS FOR OBTAINING RADIOGRAPHS

BACKGROUND OF THE INVENTION

1. Field of the Invention

This invention relates to a method and apparatus for obtaining radiographs, and more particularly to such a method and apparatus by which X-ray images can be obtained by imagewise exposuring a cloud chamber containing a high atomic number gas mixed with a condensate vapor.

2. Description of the Prior Art

Cloud chambers, first devised by C. T. R. Wilson, have long been used to render visible the paths of ionizing particles. Such early chambers contained saturated water vapor and air. By allowing the mixture to expand quickly (adiabatically), the vapor cools and water droplets condense on any particles which serve a nuclei of condensation. An ionizing particle moving rapidly in the water vapor creates many ions and electrons in its path. Water droplets condense on these ions and electrons and thus make visible the path of the ionizing particle. This effect is totally obscured at slightly greater expansions by the copious condensation upon uncharged aggregates of molecules.

Such cloud chambers exhibited a serious disadvantage; a long recovery time. In 1949, it was found that by following the expansion and drop-growth interval with an overcompression, the gas was heated and the reevaporation of the drops speeded.

U.S. Pat. No. 2,899,557, which issued Aug. 11, 1959 to Robert R. Wilson, discloses an apparatus for obtaining shadowgraphs or radiographs of an object exposed to X-rays by use of a cloud chamber, and for photographically recording the radiograph thus produced. An object to be radiographed is placed between an X-ray source and a cloud chamber having a pair of spaced end walls. The inner surface of the end wall closest to the X-ray source is coated with lead glass. X-rays which pass through the object impinge on the lead glass plate and cause secondary electron emission from the lead glass, varying in intensity inversely with the density of the object under observation, through the cloud chamber to produce vapor trails as explained hereinbefore. Since the electron emission is dependent upon the number of X-rays reaching the lead glass plate, and the intensity of X-rays vary throughout the image in proportion to the character of the object being radiographed, the cloud chamber image is therefore indicative of the physical character of the object. The image produced within the chamber may be observed or photographed through the wall opposite the X-ray source.

Although the apparatus just described produces acceptable radiographs, the electrons emerging from the lead glass plate have excessive range in the relatively low density gas between the plates and therefore cannot produce sharp images. Further, the apparatus' quantum efficiency (the fraction of X-ray photons absorbed by a device which lead to a detectable event) is quite low, requiring excessive X-ray dosages. The lead glass (or other heavy metal or metal coating), upon absorbing X-rays, emits both primary photoelectrons from the tightly bound K, L or M sheels as well as secondary electrons caused by the ionizing effects of the primary electrons within the metal. The primary electrons have high energy (tens of thousands of electron volts), and they create many secondary electrons within the metal, thereby losing their energy. Most of the primary electrons loose so much energy in the process of secondary ionization that they are trapped inside the metal coating. A very few primaries lose only a small amount of energy and are emitted into the cloud chamber. The second electrons created in the metal coating by the primaries are also mostly unable to exit from the coating surface.

Other prior art radiographic devices employ film in conjunction with intensifying screens. But even these devices exhibit quantum efficiencies of only around 20 to 40 percent. Further, the screens are rather expensive, contact with the film is not too good and the screens are easily damaged during use.

SUMMARY OF THE INVENTION

Accordingly, it is an object of the present invention to provide a new and improved apparatus of superior quantum efficiency for obtaining radiographs. This is done in part by imagewise exposing a cloud chamber containing a high atomic number gas mixed with a condensate vapor, and by using sufficiently high pressure in the chamber to assure substantially complete absorption of the incident X-rays. Thus, the problem of the low probability of escape of electrons from the heavy metal coating of prior art devices such as shown in aforementioned U.S. Pat. No. 2,899,557, which leads to very low photoelectric quantum efficiencies, is completely overcome since the electrons are directly generated in the gas itself.

The gas in the chamber is chosen for high absorption of X-rays per atom or molecule, high scattering cross section for electrons and low values of energy loss per ionization. The suitable gases are those of high atomic number, i.e., atomic numbers of at least 36, and preferably Xenon, possibly with mixtures of such things as methyl iodide or argon.

Another advantage of the use of a high atomic number gas under high pressure is the resultant shortened mean free path of the electrons formed in the gas. Since the ionization is confined, resolution is improved.

Yet another advantage of the use of a high atomic number gas under high pressure is that the thickness of the cloud chamber can be kept to a minimum while still providing for capture of substantially all the X-rays. By keeping the thickness to a minimum, the field of focus of a recording camera, and hence its aperture size, may also be kept at a minimum.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawing which is a schematic view, partially in section, of a preferred embodiment of the present invention.

DESCRIPTION OF THE PREFERRED EMBODIMENT

The present description will be directed in part to elements forming part of, or cooperating more directly with, apparatus in accordance with the present invention. It is to be understood that elements not specifically shown or described may take various forms well known to those skilled in the art.

Referring to the drawing, a source of X-rays 10 is spaced from a cloud chamber 12 constructed in accordance with a preferred embodiment of the present invention. Chamber 12 has a pair of X-ray transparent end walls 14 and 16, wall 14 being light transparent while wall 16 is a mirror having a curved surface 18. Mirror 16 is shown as being a second surface mirror, but could also be a front surface as well as a fresnel mirror. The center of curvature of mirror surface 18 coincides with the position of X-ray source 10.

The end of the chamber closest to source 10 is covered by a plate 20, preferably curved for structural reasons and constructed of plastic. Plate 20 acts as a safety shield in the event the chamber is ruptured. A fill 22, such as a foam polymer lies between plate 20 and the rear surface of mirror 16. The function of fill 22 will be explained hereinafter. A Buckey grid 23, known in the art for its usefulness in increasing the resolution of images in cloud chambers by decreasing ray scatter, has been located in front of the chamber.

To complete the cloud chamber, end walls 14 and 16 are joined by an expandable annular side wall 24, shown in the preferred embodiment as taking the form of an elastic bellows.

Window 14 is shown held in an annular block 26 having a wedged surface 28 which coincided with a matching surface on window 14. As will be explained hereinafter, in operation window 14 is under considerable pressure from within the chamber and the wedge shape of surface 28 puts the center of window 14 under a compressive force, thereby increasing its ability to withstand such pressures.

End wall 17 and block 26 are mounted by means, not illustrated, for movement toward and away from mirror 16. A compression device, schematically shown as a piston and cylinder 30, moves wall 14 toward wall 16 by compressing bellows 24, thereby increasing the pressure in the cloud chamber when required during exposure and reconstitution of the chamber. Of course many suitable devices for moving end wall 14 will readily occur to those skilled in the art.

Behind window 14, in a light tight housing 32, are located a pair of flash lamps 34 and 36, two field lenses 38 and 40, a camera 42, a half-silvered mirror 44 and an eyepiece 46. The function of field lenses 38 and 40 will be explained hereinafter, but generally, they are selected to image the anode spot of X-ray source 10 on the viewing field, i.e., the stop aperture of camera 42 and eyepiece 46.

The cloud chamber defined by end walls 14 and 16 and side wall 24 is filled with a high atomic number gas mixed with a condensate vapor. The gas is held at superatmospheric pressure so as to be substantially X-ray opaque, acting as an electron emitter when exposed to X-rays from source 10. Preferably, the gas it thermostated by conventional means, not show, so as to maintain a constant temperature. Foam polymer fill 22 prevents any leakage of the gas into the area in front of mirror 16, any such leakage being detrimental due to the X-ray absorption characteristics of the gas.

Operation

An object to be radiographed is positioned between radiation source 10 and cloud chamber 12. End wall 14 is allowed to move away from opposite wall 16 to quickly expand, in an adiabatic manner, the condensing vapor, thereby rendering the vapor supersaturated.

X-ray source 10 is actuated and the X-rays, after traversing the object and being differentially attenuated, impinge on the cloud chamber. Buckey grid 23 substantially eliminates any X-ray scatter so that the rays entering the cloud chamber are normal to mirror surface 18. As explained hereinbefore, the high atomic number gas absorbs the X-rays, producing ions and photoelectrons in the ray paths differentially in proportion to the incident X-rays. The supersaturated vapor begins to condense on these ions and electrons and thus make visible the path of the ionizing particles.

After the droplets have grown to an adequate size, flash lamps 34 and 36 are energized to illuminate the droplets so that they can be photographed by camera 42 and/or viewed at eyepiece 46. Since the image formed by the ionizing radiation consists of line segments directed toward X-ray source 10, the film must view the image along these lines to obtain maximum resolution. To do this, mirror surface 18 has a center of curvature at the anode spot of X-ray source 10 so that the images of the line segments produced by the mirror line up with the actual line segments so as to appear to be one continuous line diverging from the anode spot. The diverging image is redirected by field lenses 38 and 40 so that the camera lens is in effect looking down the axis of the line segments over the entire image field.

When the recording and/or viewing has taken place for the radiograph desired, the system is reconstituted by repressurizing the cloud chamber by means of piston and cylinder 30, causing the droplets to evaporate. I have found that it is desirable to recompress the chamber for several seconds to a pressure in excess (about 5 percent) of the original pressure in order to heat the gas to a temperature high enough to ensure evaporation of the droplets prior to settling and to reduce residual thermal gradients in the gas. The chamber is then restored to the normal pressure for storage on the next radiograph.

Operational Example

While wanting to restrict the choice of materials and method of operation, the following examples have been found to work very well.

As stated hereinbefore, the gas in the cloud chamber is chosen for high absorption of X-rays per atom of molecule, high scattering cross section for electrons (per atom) and low values of energy loss per ionization. The suitable gases are those of high atomic numbers; at least 36. I have found that Xenon works well.

Optimum pressure and cross-sectional thickness of the cloud chamber vary with the kilo voltage of the X-rays. The gas pressure should be at least 100 psi absolute to insure adequate stopping power and droplet formation. I have found that 150 psi works well with 90 kilo volt X-rays in a one inch thick chamber for X-rays filtered through a reasonable section of human body.

The condensating material chosen was isopropyl alcohol, and the mixture to the Xenon is of course controlled by the vapor pressure of the alcohol. This is around 200 Torr at room temperature, but as long as there is about 2 Torr of alcohol in the chamber, there is sufficient alcohol to supply matter for the droplets.

SUMMARY

The method and operation of the present invention result in the conversion of a very high number of X-rays into high energy photoelectrons which produces an increased number of droplets per ray than was heretofore available. The consequence of the large number of droplets per X-ray photon, the high fractional absorption and the relatively great amplification by virtue of allowing the condensation of vapor to proceed permits a production of a highly scattering media with a relatively low X-ray exposure, thereby reducing the radiographic exposure of the patient.

The invention has been described in detail with particular reference to a preferred embodiment thereof, but it will be understood that variations and modifications can be effected within the spirit and scope of the invention.

I claim:

1. Radiographic apparatus for operation with a source of X-rays, said apparatus comprising:
   means defining an air-tight chamber having a first, optically transparent end wall and a second, X-ray transparent end wall positioned between said X-ray source and said first end wall;
   a mixture in said chamber, said mixture comprising (1) an X-ray absorber gas having an atomic number of at least 36, said absorber gas acting as an ion and electron emitter when exposed to X-rays, and (2) a supersaturated vapor adapted to condense on said ions and electrons whereby the path of the X-rays will be made visible; and
   means for maintaining said absorber gas at a superatmospheric pressure so as to be substantially X-ray opaque.

2. The apparatus as defined in claim 1 wherein said X-ray absorber gas in Xenon.

3. The apparatus as defined in claim 1 wherein said vapor is isopropyl alcohol.

4. The apparatus as defined in claim 1 wherein said superatmospheric pressure is at least 100 psi absolute.

5. The apparatus as defined in claim 1 wherein said second end wall includes a light-reflecting surface having a center of curvature substantially at the X-ray source and adapted to reflect light impinging upon said surface from the direction of said first end wall.

6. The apparatus as defined in claim 5 further comprising:
   means defining a viewing field; and
   lens means, spaced from said first end wall on the side opposite said second end wall, for redirecting onto said viewing field light diverging normally from said light-reflecting surface.

7. The apparatus as defined in claim 6 further comprising a camera, and wherein said viewing field comprises said aperture of a camera.

8. The apparatus as defined in claim 6 wherein said viewing field comprises a rear illumination screen.

9. The apparatus as defined in claim 1 wherein said first wall is mounted for movement toward and away from said second wall, and further comprising means for so moving said first wall.

10. Radiographic apparatus comprising:
    a source of X-rays;
    means defining an air-tight chamber having a first, optically transparent end wall and a second, X-ray transparent end wall positioned between said X-ray source and said first end wall;
    means for illuminating said chamber;
    a mixture in said chamber, said mixture comprising (1) an X-ray absorber gas having an atomic number of at least 36, said absorber gas acting as an ion and electron emitter when exposed to X-rays, and (2) a supersaturated vapor adapted to condense on said ions and electrons whereby the path of the X-rays will be made visible; and
    means for maintaining said absorber gas at a superatmospheric pressure so as to be substantially X-ray opaque.

* * * * *

UNITED STATES PATENT AND TRADEMARK OFFICE
CERTIFICATE OF CORRECTION

PATENT NO. : 4,047,031
DATED : September 6, 1977
INVENTOR(S) : Lee Fitzpatrick Frank It is certified that error appears in the above-identified patent and that said Letters Patent are hereby corrected as shown below:

Column 1, line 9, "exposuring" should read --exposing--; line 63, "sheels" should read --shells--.

Column 2, line 1, "loose" should read --lose--.

Column 3, line 54, "show" should read --shown--.

Column 4, line 38, insert --not-- after "While"; line 42, "of" (second occurrence) should read --or--.

Signed and Sealed this

Fourteenth Day of March 1978

[SEAL]

Attest:

RUTH C. MASON
Attesting Officer

LUTRELLE F. PARKER
Acting Commissioner of Patents and Trademarks